United States Patent

[11] 3,596,502

| [72] | Inventors | Willard W. Bayre<br>Amherst;<br>John A. Erickson, Port Clinton, both of, Ohio |
| --- | --- | --- |
| [21] | Appl. No. | 874,625 |
| [22] | Filed | Nov. 6, 1969 |
| [45] | Patented | Aug. 3, 1971 |
| [73] | Assignee | General Motors Corporation<br>Detroit, Mich. |

[54] ULTRASONIC FATIGUE TESTING
4 Claims, 2 Drawing Figs.

| [52] | U.S. Cl. | 73/67.3 |
| --- | --- | --- |
| [51] | Int. Cl. | G01n 29/00 |

[50] Field of Search............................................73/67, 67.3, 67.4

[56] References Cited
UNITED STATES PATENTS

| 2,660,881 | 12/1953 | V an Degrift | 73/67.3 X |
| --- | --- | --- | --- |
| 3,490,270 | 1/1970 | Kleesattel | 73/67.3 |

*Primary Examiner*—Richard C. Queisser
*Assistant Examiner*—Arthur E. Korkosz
*Attorneys*—Warren E. Finken and F. J. Fodale ABSTRACT: A method of duplicating the stress cycling experienced by a bearing race in which a probe is loaded radially into the raceway and ultrasonically vibrated in a tangential direction is disclosed.

PATENTED AUG 3 1971

3,596,502

INVENTORS
Willard W. Bayre &
BY John A. Erickson

F.J. Fodale
ATTORNEY

ULTRASONIC FATIGUE TESTING

This invention relates generally to a testing method and more specifically to a method which substantially duplicates the cyclic loading produced by a body under load rolling on a surface.

Attempts heretofore have been made to duplicate rolling contact stress cycling, such as, for instance, is experienced by the race of a radial roller bearing, however, no satisfactory substitute has been found. Consequently, fatigue and similar tests on the bearing race, for instance, require the fabrication and testing of an entire bearing.

Accordingly the object of this invention broadly is to provide a method for substantially duplicating rolling contact stress cycling which does not require use of an entire bearing assembly nor involves a body rolling under load.

Other objects and advantages of the invention will hereinafter become more fully apparent from the following description of the annexed drawings, which illustrate a preferred embodiment, and wherein.

Figure 1:
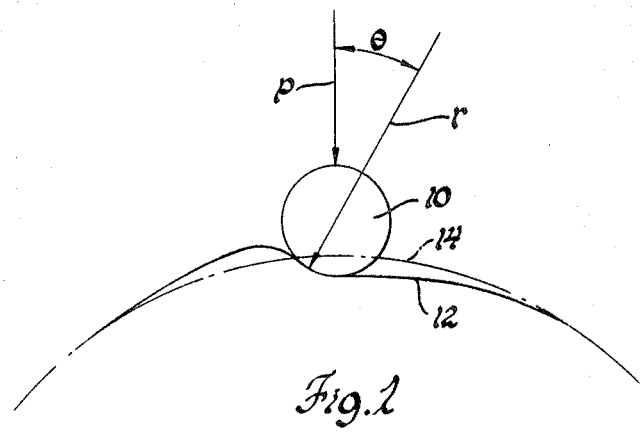
FIG. 1 is a schematic showing the forces exerted on the raceway surface of a race by a roller.

Referring now to the drawings and more specifically to FIG. 1, 10 represents a roller in a conventional radial roller bearing. The outer race is not represented, however, let us assume that it imposes a vertical load $p$ which is to be transferred to the inner race through the roller 10. As the roller 10 rolls along the inner raceway surface in a counterclockwise direction with respect to the bearing race 10, the metal directly under the roller is depressed slightly and the metal immediately ahead of the roller is rolled up slightly. This condition of the bearing raceway surface is greatly exaggerated in FIG. 1 and presented by the solid line 12. The normal unstressed condition of the raceway is indicated by the dotted line 14 and the roller is assumed to have maintained a perfectly cylindrical shape although it will deform to a slight oval. From an inspection of the solid line condition in FIG. 1, it becomes apparent that the load from the roller 10 to the raceway is applied not in a pure radial direction but at some angle $\theta$ with respect to the radial direction.

It appears the failure to recognize or appreciate the significance of this reaction of the raceway surface metal to the roller may have been an obstacle in the past to substantially duplicating rolling contact stress cycling.

Figure 2:
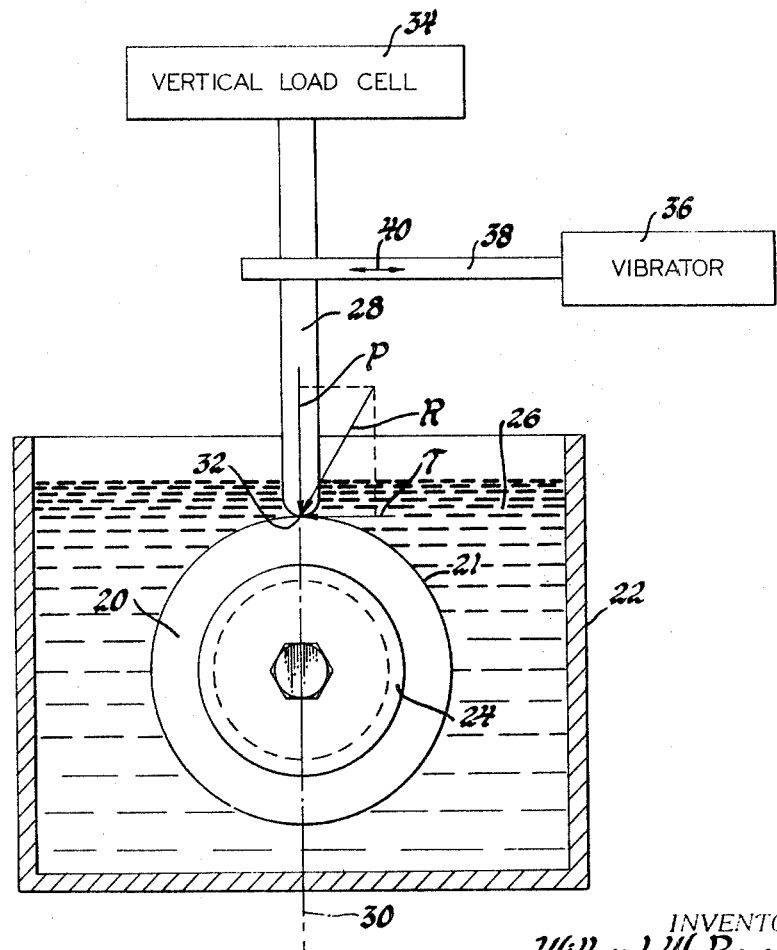
FIG. 2 is a schematic showing apparatus by which the method of our invention may be carried out.

Referring now to FIG. 2, the subject method will be described in connection with schematically shown apparatus capable of carrying out the method. A bearing inner race 20 is securely and nonrotatably mounted in a vessel 22 by means of a mounting member 24 secured to suitable complementary structure behind the race by a bolt. The vessel 22 is filled with sufficient liquid coolant 26 to completely submerge the bearing race 20. A probe 28 located in alignment with a radial plane 30 of the raceway 20 includes a rounded tip 32. For a roller bearing race, the tip is preferably semicylindrical and is similar in contour to the type of roller ultimately to be used with a race. Of course, in other circumstances, other type probes might be used, as for instance, a probe having a hemispherical tip may be more appropriate to duplicate the rolling contact stress cycling produced by a ball.

A vertical load cell 34 applies a vertical force $P$ loading the tip 32 into the raceway surface 21 with a line of action on the radial plane 30. The vibrator 36 is suitably connected by structure 38 to the probe 28 to vibrate the probe 28 back and forth as indicated by the double-headed arrow 40. The probe is preferably vibrated in the ultrasonic range. It has satisfactorily been vibrated at 15,000 cycles per second. The vibrator may be such that force is applied by the tip 32 in both directions or in a single direction with a nonforce applying return.

Focussing now on the tip 32 and halting the vibrator on its stroke toward the left, it is seen that a tangential force $T$ is applied to the raceway surface 21 which when combined with the radial force $P$ results in a Resultant Force $R$ at an angle to the radial plane 30. (Recall in connection with FIG. 1 that the force $r$ was angularly related to the radius line of the bearing.) In order to fail the bearing in fatigue as opposed to another failure mechanism, the rolling contact stress cycling is substantially duplicated. In order to accomplish this, the force at the bearing surface 21 is sufficient to prevent relative motion between the probe tip 32 and the bearing surface 21 and at the same time, the force is not so great so as to stress the bearing beyond its elastic limit and cause plastic deformation.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

What I claim is:

1. A method of fatiguing an antifriction bearing race within a relatively short period of time by substantially duplicating the stress cycling experienced by the antifriction bearing race comprising the steps of:

fixedly mounting the bearing race in a vessel filled with a cooling liquid to a level sufficient to submerge the bearing race, engaging a raceway surface on the bearing race with a rounded tip on a probe disposed substantially on a radial plane of said bearing, applying a normal force to said bearing through said probe, said normal force being of sufficient magnitude to prevent relative motion between said tip and said raceway surface, and simultaneously ultrasonically vibrating said probe in a substantially tangential direction with a second force which when combined with said first force results in forces which do not stress the bearing beyond its elastic limit until said bearing race fails whereby the bearing race be fatigue tested without being incorporated into a bearing assembly.

2. A method of substantially duplicating the stress cycling experienced by an antifriction bearing race or the like comprising the steps of:

providing a probe having smoothly curved engagement surface, loading said probe engagement surface into a test surface on a metallic test specimen in a generally normal direction with a first force and, a vibrating said probe ultrasonically while so loaded in a generally transverse direction producing a second force which when combined with said first force results in a force sufficient to prevent relative motion between the probe engagement surface and the specimen test surface and which does not load the specimen beyond its elastic limit.

3. A method of substantially duplicating the stress cycling experienced by an antifriction bearing race or the like comprising the steps of:

providing a probe having a rounded tip, loading said rounded tip into an arcuate surface on a metallic test specimen with a first force applied in a direction substantially normal to said arcuate surface, and simultaneously vibrating said tip in a substantially tangential direction with a second force which when combined with said first force results in forces sufficient to prevent relative motion between said tip and said arcuate surface and which do not stress the specimen beyond its elastic limit.

4. The method as defined in claim 3 wherein said tip is vibrated at substantially 15,000 cycles per second.